(12) United States Patent
Workman et al.

(10) Patent No.: US 8,893,897 B2
(45) Date of Patent: Nov. 25, 2014

(54) SECURE, QUICK ATTACHMENT AND RELEASE BICYCLE SUPPORT SYSTEMS

(75) Inventors: Jonathan Workman, Loveland, CO (US); Donald H. Eason, Fort Collins, CO (US)

(73) Assignee: Feedback Sports, LLC, Golden, CO (US)

( * ) Notice: Subject to any disclaimer, the term of this patent is extended or adjusted under 35 U.S.C. 154(b) by 0 days.

(21) Appl. No.: 11/813,754

(22) PCT Filed: Jan. 12, 2005

(86) PCT No.: PCT/US2005/001115
§ 371 (c)(1),
(2), (4) Date: Jul. 11, 2007

(87) PCT Pub. No.: WO2006/075983
PCT Pub. Date: Jul. 20, 2006

(65) Prior Publication Data
US 2008/0203255 A1    Aug. 28, 2008

(51) Int. Cl.
| | | |
|---|---|---|
| A47F 7/00 | (2006.01) | |
| B62H 3/00 | (2006.01) | |
| B25B 5/00 | (2006.01) | |
| B25B 5/08 | (2006.01) | |
| B25B 5/12 | (2006.01) | |
| B25B 5/14 | (2006.01) | |
| B25B 5/16 | (2006.01) | |
| B25H 1/00 | (2006.01) | |

(52) U.S. Cl.
CPC  *B62H 3/00* (2013.01); *B25B 5/003* (2013.01); *B25B 5/006* (2013.01); *B25B 5/08* (2013.01); *B25B 5/12* (2013.01); *B25B 5/147* (2013.01); *B25B 5/163* (2013.01); *B25H 1/0014* (2013.01)
USPC .......... 211/17; 211/22; 248/122.1; 248/316.4

(58) Field of Classification Search
USPC .......... 211/17, 22, 5; D8/72; 269/64, 68, 214, 269/215, 193; 224/535, 536; 81/487, 152; 24/459, 492, 494, 498–499, 590.1, 24/573.11, 593.11; 248/122.1, 125.7, 248/125.8, 316.4
See application file for complete search history.

(56) References Cited

U.S. PATENT DOCUMENTS 288,722 A * 11/1883 Morris .......................... 269/182
579,584 A *  3/1897 Jessup ............................. 211/17
(Continued)

FOREIGN PATENT DOCUMENTS

| CN | 1485004 A | 3/2004 |
|---|---|---|
| EP | 1838180 B1 | 6/2014 |

(Continued)

OTHER PUBLICATIONS

Ultimate Support Systems Inc. 1992 Product Catalog (Bike Stand Edition).
Ultimate Support Systems Inc. 1993 Product Catalog (Bike Stand Edition).
Ultimate Support Systems Inc. 1993 Product Catalog (Music Stand Edition).

(Continued)

*Primary Examiner* — Korie H Chan
(74) *Attorney, Agent, or Firm* — Santangelo Law Offices, P.C.

(57) ABSTRACT

A device and method of clamping bicycles in a mouth (6) having a moveable jaw (8) and a stationary jaw (7) to which a high load potential may be utilized within a toggle joint (18) and ratchet mechanism (14) and a release (12) may be triggered to open a mouth in a quick movement(s). In embodiments, a multisized object securement grip (9) may be located on a contact surface of a moveable jaw and stationary jaw to allow for universal gripping of various sized objects.

33 Claims, 13 Drawing Sheets

(56) References Cited

U.S. PATENT DOCUMENTS

| | | | | |
|---|---|---|---|---|
| 605,429 | A | * | 6/1898 | Howard .......................... 211/22 |
| 619,186 | A | * | 2/1899 | Kingsbury ...................... 211/22 |
| 774,574 | A | * | 11/1904 | Fleischmann ................ 269/194 |
| 1,857,001 | A | * | 5/1932 | Omholdt ....................... 269/215 |
| 2,359,951 | A | | 9/1942 | Warman |
| 2,464,630 | A | * | 3/1949 | Zitner ........................... 269/193 |
| 2,485,641 | A | * | 10/1949 | Nelson .......................... 269/192 |
| 2,631,346 | A | | 3/1953 | Wengen |
| 2,855,964 | A | * | 10/1958 | Zelazny ........................ 269/215 |
| 2,920,665 | A | | 1/1960 | Hutson |
| 3,389,624 | A | | 6/1968 | Pooler, Jr. |
| 3,427,016 | A | * | 2/1969 | Harris ........................... 269/214 |
| 3,492,854 | A | * | 2/1970 | Eppler ............................ 72/412 |
| 3,514,091 | A | * | 5/1970 | Engstrom et al. ............... 269/68 |
| D229,132 | S | * | 11/1973 | Uroshevich .................... D6/431 |
| 3,947,010 | A | * | 3/1976 | Zeller ........................... 269/100 |
| 3,981,491 | A | * | 9/1976 | Snyder ............................ 269/64 |
| 4,253,648 | A | * | 3/1981 | Meeks ............................... 269/4 |
| 4,671,479 | A | | 6/1987 | Johnson et al. |
| 4,676,414 | A | * | 6/1987 | Deguevara .................... 224/535 |
| 4,887,754 | A | | 12/1989 | Boyer et al. |
| 4,923,185 | A | * | 5/1990 | Fan ............................... 269/181 |
| 4,988,064 | A | * | 1/1991 | Hoshino ....................... 248/170 |
| 5,048,789 | A | | 9/1991 | Eason et al. |
| D326,969 | S | | 6/1992 | Eason et al. |
| 5,222,420 | A | * | 6/1993 | Sorensen et al. ................ 81/487 |
| 5,222,707 | A | | 6/1993 | Myers |
| 5,277,346 | A | | 1/1994 | Stier |
| 5,385,280 | A | * | 1/1995 | Littlepage et al. ............. 224/521 |
| D356,901 | S | * | 4/1995 | Schoenig et al. .............. D6/400 |
| 5,509,629 | A | * | 4/1996 | Sassmannshausen et al. ............................. 248/171 |
| D372,691 | S | | 8/1996 | Eason |
| 5,584,457 | A | | 12/1996 | Fawcett |
| 5,605,321 | A | | 2/1997 | Jarvis |
| 5,638,706 | A | | 6/1997 | Stevens |
| 5,769,556 | A | | 6/1998 | Colley |
| 5,791,610 | A | | 8/1998 | Sanchez |
| D416,464 | S | | 11/1999 | Eason |
| 5,996,814 | A | * | 12/1999 | Workman et al. ............... 211/22 |
| D421,447 | S | | 3/2000 | Eason et al. |
| 6,089,556 | A | * | 7/2000 | Whiteford ..................... 269/149 |
| 6,123,326 | A | * | 9/2000 | Kleinbongartz .............. 269/215 |
| D435,365 | S | | 12/2000 | Eason et al. |
| 6,273,392 | B1 | | 8/2001 | Birkhold |
| 6,283,421 | B1 | | 9/2001 | Eason et al. |
| 6,286,797 | B1 | | 9/2001 | Thaxton |
| D450,339 | S | | 11/2001 | Eason |
| 6,338,475 | B1 | * | 1/2002 | Ping ................................. 269/6 |
| 6,375,135 | B1 | | 4/2002 | Eason et al. |
| 6,547,116 | B2 | * | 4/2003 | Anderson et al. ............. 224/536 |
| D490,289 | S | * | 5/2004 | Chuang ........................... D8/72 |
| 6,789,772 | B2 | | 9/2004 | Eason |
| 6,820,849 | B2 | | 11/2004 | Kennard |
| D556,530 | S | * | 12/2007 | Workman et al. ................ D8/72 |
| 2004/0046091 | A1 | | 3/2004 | Chuang |
| 2007/0057001 | A1 | * | 3/2007 | Wang ............................ 224/536 |

FOREIGN PATENT DOCUMENTS

| | | |
|---|---|---|
| JP | 61-42254 | 3/1986 |
| JP | 62-106757 | 7/1987 |
| JP | 2004148412 | 5/2004 |
| WO | WO 2006/075983 | 7/2006 |

OTHER PUBLICATIONS

Ultimate Support Systems Inc. 1994 Product Catalog (Music Stand Edition).
Ultimate Support Systems Inc. 1995 Product Catalog (Bike Stand Edition).
Ultimate Support Systems Inc. 1996 Product Catalog (Music Stand Edition).
Ultimate Support Systems Inc. 1998 Product Catalog (Music Stand Edition).
Ultimate Support Systems Inc. 1999 Product Catalog (Music Stand Edition).
Ultimate Support Systems Inc. 2000 Product Catalog (Music Stand Edition).
Ultimate Support Systems Inc. 2000 Product Catalog (Bike Stand Edition).
Ultimate Support Systems Inc. 2001 Product Catalog (Music Stand Edition).
Ultimate Support Systems Inc. 2001/2002 Product Catalog (Bike Stand Edition).
Ultimate Support Systems Inc. 2002 Product Catalog (Music Stand Edition).
Ultimate Support Systems Inc. 2003 Product Catalog (Music Stand Edition).
Ultimate Support Systems Inc. 2004 Product Catalog (Bicycle Stand Edition).
Ultimate Support Systems Inc. 2004 Product Catalog (Music Stand Edition).
Ultimate Support Systems Inc. 2005 Product Catalog (Bicycle Stand Edition).
Ultimate Support Systems Inc. 2005 Product Catalog (Music Stand Edition).
Total Bike Park Tool PRS-15 Pro Race Stand, Oct. 27, 2004.
Supergo Bike Shops, Pedro's Repair Stand, Oct. 27, 2004.
Yamaha CL-945 YESS Tom Ball Clamp, Apr. 26, 2007.
International Application No. PCT/US2005/01115, Written Opinion dated Oct. 11, 2005.
International Application No. PCT/ US2005/01115, Search Report dated Oct. 11, 2005.
Parallel Chinese Patent Application No. 200580048029.6; Office Action dated Jul. 10, 2009.
Parallel Japanese Patent Application No. 2007-551234; Office Action dated Jul. 1, 2010.
Parallel Chinese Patent Application No. 200580048029.6; Office Action dated Sep. 7, 2010.
Parallel European Regional Patent Application No. 05 711 426.6; Supplementary Search Report dated Jan. 24, 2012.
Parallel Chinese Patent Application No. 200580048029.6; Notice of Allowance dated Jul. 6, 2011.
Parallel European Regional Patent Application No. 05 711 426.6; Search Report dated Jan. 24, 2012.
Parallel European Regional Patent Application No. 05 711 426.6; Office Action dated Aug. 29, 2012.
Parallel European Patent Application No. 05 711 426.6, Decision to Grant; May 22, 2014; 2 pages.
Parallel European Patent Application No. 05 711 426.6; Informalities Notice, Jan. 29, 2014; 38 pages.
Chinese Patent No. CN101115419B, Invention Patent Certificate, Jul. 6, 2011, 3 pages.
European Patent Application No. 05 711 426.6; Notice of Allowance dated Jan. 29, 2014; 38 pages.

* cited by examiner

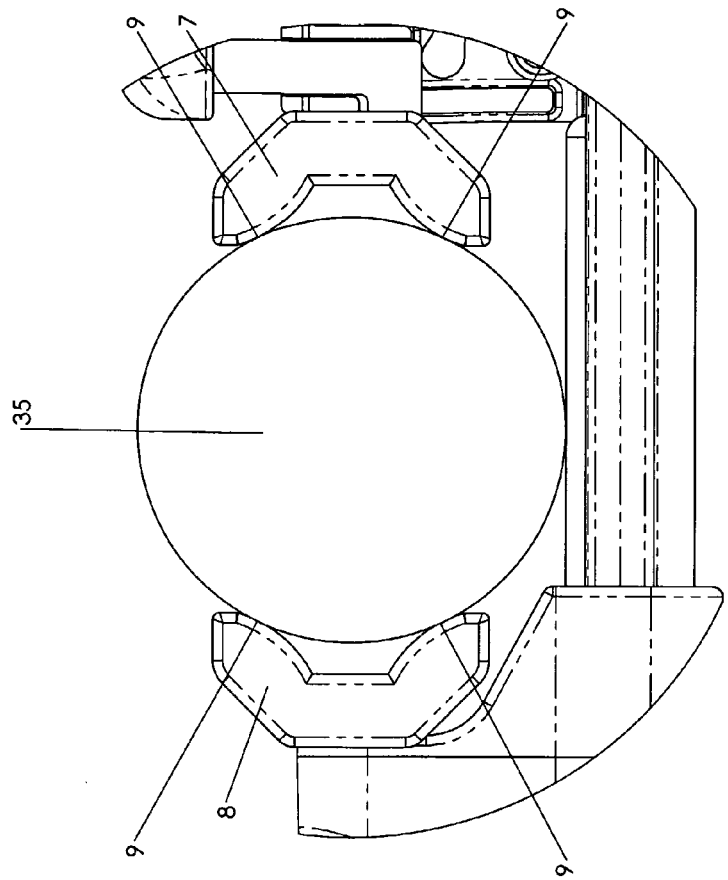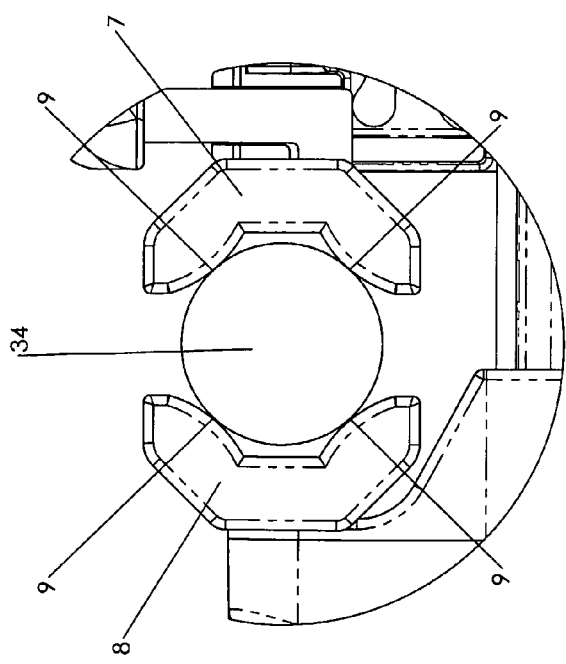

SECURE, QUICK ATTACHMENT AND RELEASE BICYCLE SUPPORT SYSTEMS

I. TECHNICAL FIELD

The present invention relates generally to the field of clamping and supporting various objects which provide secure and perhaps even quick attachment and release options. Specifically, the present invention provides a bicycle support apparatus and methods of using a bicycle clamp for supporting and releasing a bicycle in which a user may store, transport, perform bicycle repair and the like.

II. BACKGROUND

In the clamping field, such as with bicycle repair fields, it may be desirable to utilize clamping systems which allow for the stable and secure attachment of an object to a clamp. Conventional bicycle repair stands may be rigid and may incorporate a clamping device to grip a bicycle frame which may allow a bicycle to be rotated to any position in order to facilitate work on any component of the bicycle. A clamp support, such as in U.S. Pat. No. 5,385,280 to Littlepage et al., may utilize a riser member, clamp-support member and a screw operated clamp. There are other known devices for bicycle repair clamps and stands, for example, in U.S. Pat. No. 3,981,491 to Snyder, a work stand may include a pair of relatively movable jaws between which a tubular member may be clamped.

Previous clamps may not have provided adequate attachment of various sizes of objects, such as various sizes of bicycle tubing and the like within a clamp. Some clamps in the past may have provided a jaw clamp allowing jaws to enclose upon an object such as tubing. While a jaw clamp may be adjustable for different sized tubing, it may not adequately hold tubing so that a user may work with or perhaps even rotate a bicycle without having to readjust the clamp attachment.

Other clamps may use a pivot type motion to open and close, such as in U.S. Pat. No. 5,605,321 to Jarvis, in which a bicycle may be supported by a base and an end may double over itself. U.S. Pat. No. 6,547,116 to Anderson et al. describes a bicycle work stand which can be oriented in a desired position and may have a clamp assembly including a clamp handle tube and clamp side plates. A clamp handle tube may effect pivotal movement of a side plate into clamped and unclamped positions. It may require time consuming readjustment for secure clamping of tubing of different sizes.

Finally, other clamps may use an adjustable nut and screw to enable clamping jaws to be tightened or released. For example, in U.S. Des. 356,901 to Schoenig et al., a screw may be used to move jaws of a clamp in a closed and open position. This may require a user to have a certain amount of strength and it may also require a period of time to open and close the clamp.

III. DISCLOSURE OF THE INVENTION

Accordingly, the present invention may be directed towards clamping devices and methods which provide a clampable mouth having jaws that can securely hold a variety of different size and/or shape objects without readjustment, and that objects may be quickly attached and even quickly removed from a mouth allowing easy use of such devices.

It is therefore an object of the present invention to provide a bicycle clamp apparatus and methods in which quick attachment and quick release of a clamp to a variety of different size and/or shape objects without readjustment may occur.

Another object of the present invention may be to provide a clamp jaw that can be universally used with objects having a variety of shapes and sizes.

It is yet another object of the present invention to provide a clamp and methods of clamping in which a high force may be applied in a mouth of a clamp while providing a low force trigger to release the forces within a clamp.

Naturally, further objects, goals and embodiments of the inventions are disclosed throughout other areas of the specification claims.

IV. BRIEF DESCRIPTION OF THE DRAWINGS

FIG. 8 is an exploded view of a mouth having a small object between a stationary jaw and a moveable jaw in accordance with embodiments of the present invention.

FIG. 9 is an exploded view of a mouth having a large object between a stationary jaw and a moveable jaw in accordance with embodiments of the present invention.

V. MODE(S) FOR CARRYING OUT THE INVENTION

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The present invention provides, in embodiments, an object support apparatus and methods of clamping objects. Objects may include any object such as, but not limited to: bicycles; parts of a bicycle such as a seat post, part of a frame and the like; stands; tubular members; rounded objects; shaped objects; power equipment such as weed eaters, chainsaws and the like; motorcycles; motorcycle parts; wheelchairs; ski equipment; building supplies; car parts; and the like. The discussion in this disclosure uses a bicycle as an example, yet it is meant to be understood that a wide range of objects can be used with the various embodiments described herein.

Figure 1:
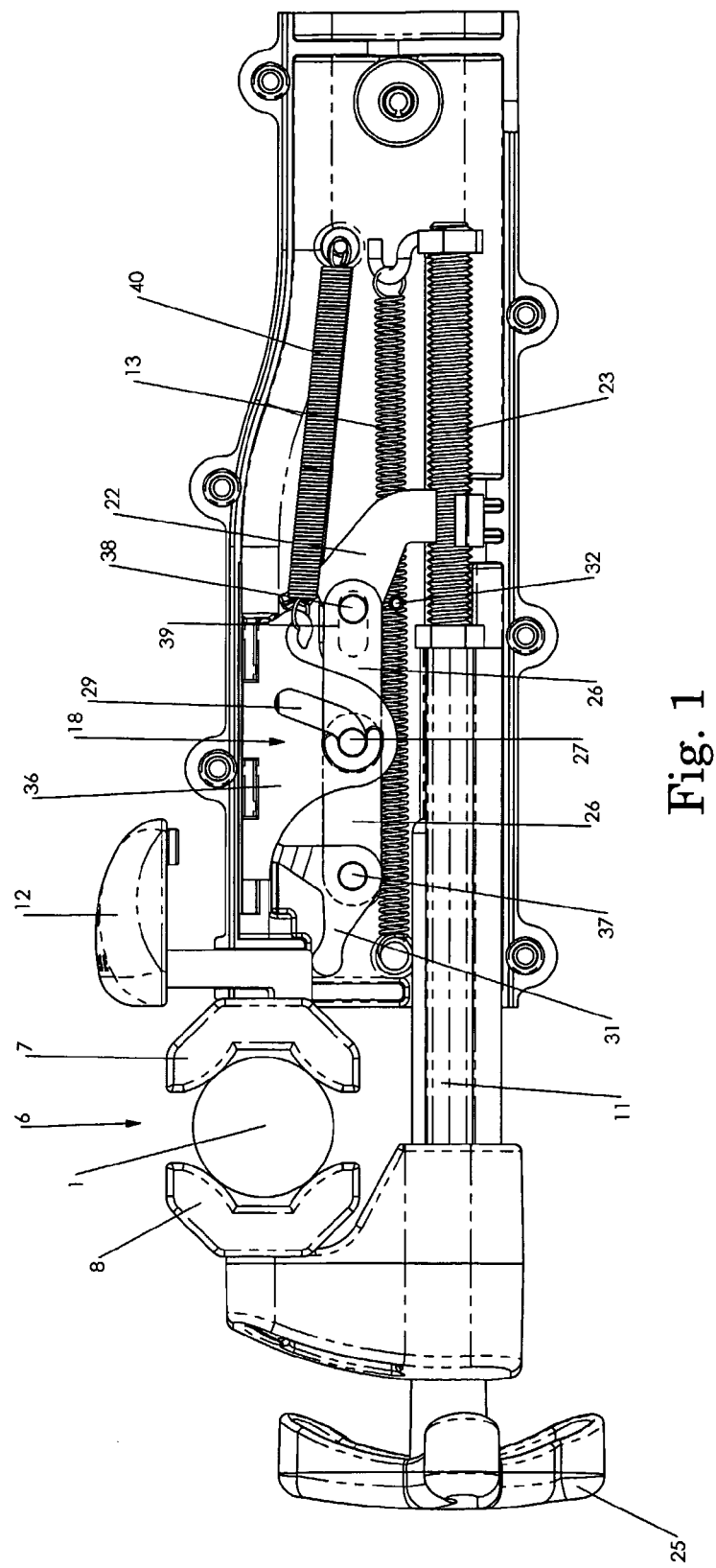
FIG. 1 is a side view of a mouth in a closed position, ratchet mechanism and toggle joint in accordance with embodiments of the present invention.

A mouth (6) such as a clampable mouth may be provided and may have a stationary jaw (7) and perhaps even a moveable jaw (8) as can be seen in FIG. 1. In alternative embodiments, a mouth may have at least two jaws and each of the jaws may be moveable and the like. Jaws of a mouth may be provided so that they can be configured to clamp, such as with parts that may be adjusted or brought closer together to hold or compress an object perhaps even without bruising or damage of such object. In embodiments, a slide (11) may be attached to a moveable jaw (8) so that a slide and a moveable jaw may move, perhaps even sliding apart from a stationary jaw when opening a mouth and contrarily sliding a moveable jaw towards a stationary jaw when closing a mouth. A slide (11) and moveable jaw may provide non-pivoting movement of a mouth and jaws, such as moving in a non-rotational manner and the like. In embodiments, a slide and moveable jaw may move in a planar or perhaps even a linear fashion with respect to a stationary jaw.

Figure 2:
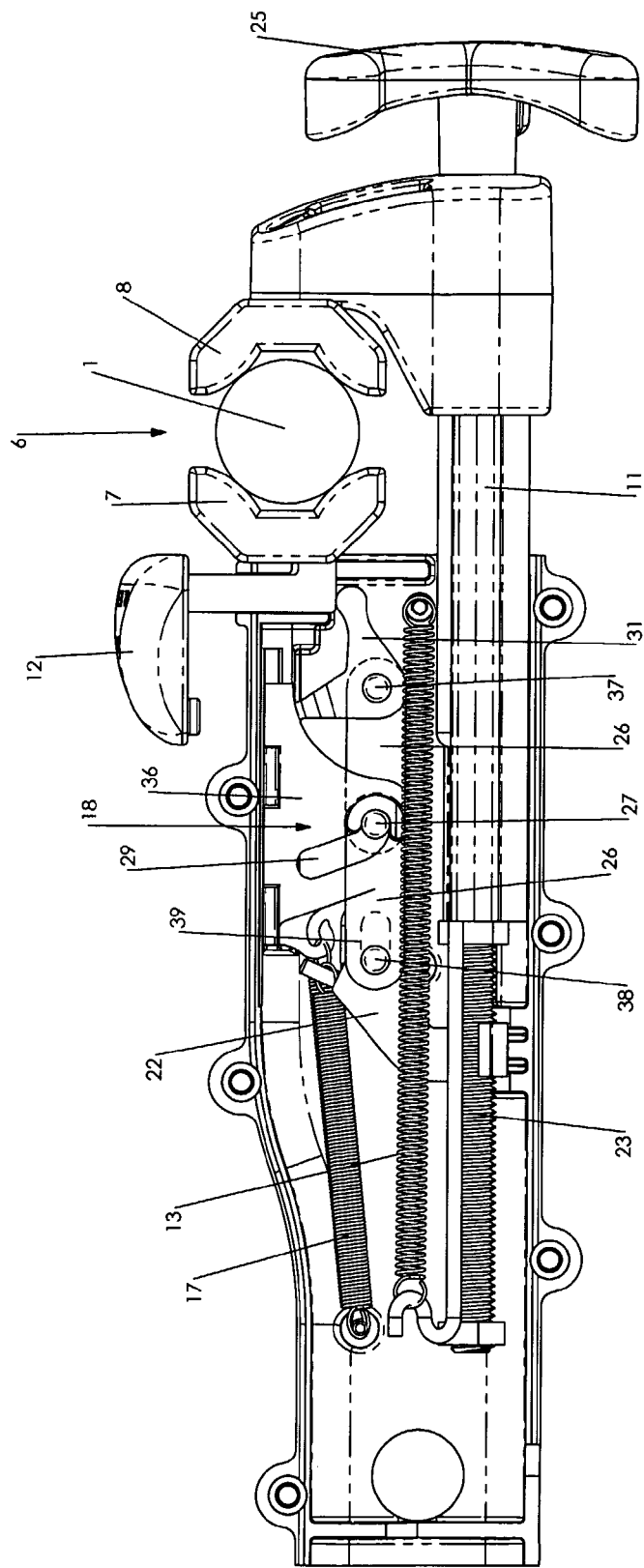
FIG. 2 is an opposite side view of a mouth in a closed position, ratchet mechanism and toggle joint as compared to FIG. 1 in accordance with embodiments of the present invention.
Figure 5:
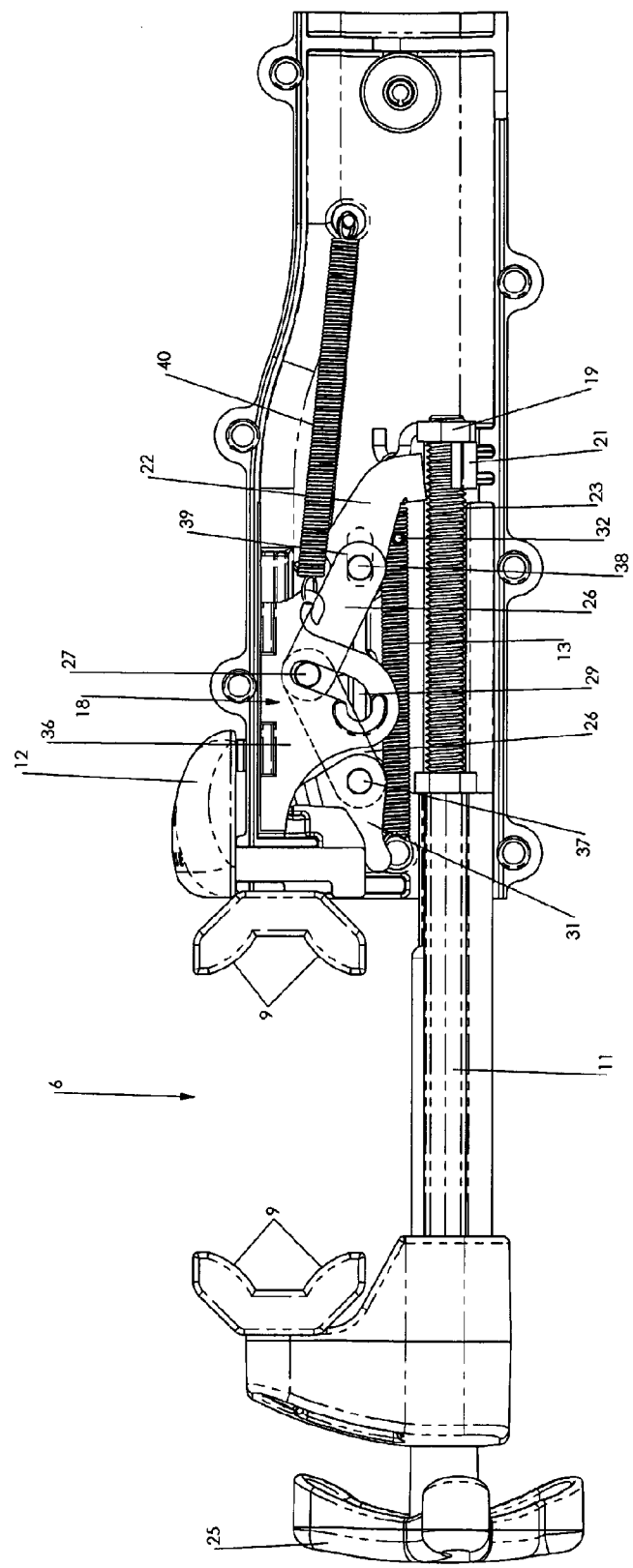
FIG. 5 is a side view of a mouth in an open position, ratchet mechanism and toggle joint in accordance with embodiments of the present invention.
Figure 6:
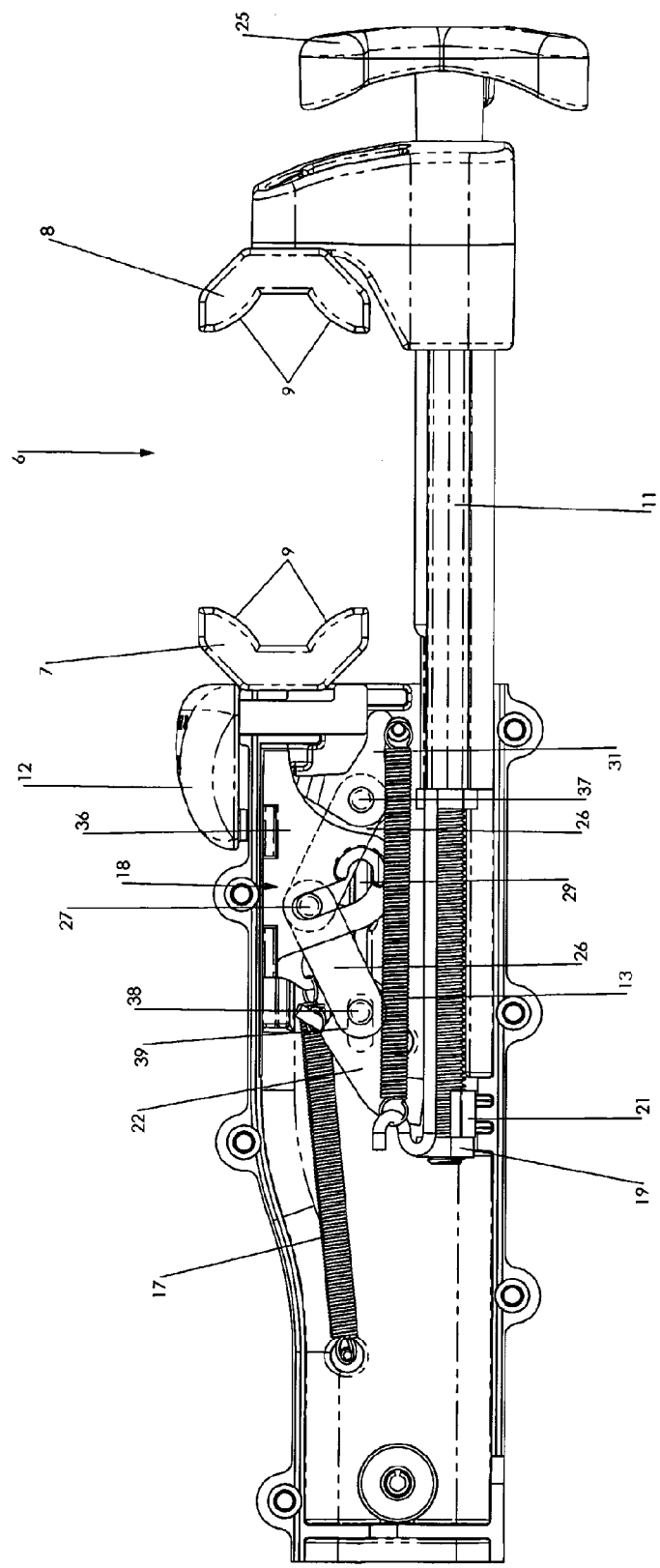
FIG. 6 is an opposite side view of a mouth in an open position, ratchet mechanism and toggle joint as compared to FIG. 5 in accordance with embodiments of the present invention.

An object (1), for example, a frame of a bicycle and the like, may be inserted into a support apparatus possibly with quick attachment to such object. A mouth (6) may have a moveable jaw (8) at an open position, as can be seen in FIGS. 5 and 6, and a user may place a bicycle or the like into a mouth between a moveable jaw (8) and a stationary jaw (7) when in an open position. An open position may include a moveable jaw at an extended position allowing for most sizes of objects to fit between a stationary jaw and a moveable jaw. Part of a bicycle may be placed against a stationary jaw (7) to which a moveable jaw may move towards the stationary jaw and bicycle frame. A user may apply force to a moveable jaw, causing the moveable jaw and the mouth to move from an open position to a desired closed position, as can be seen in FIGS. 1 and 2. Force applied to a moveable jaw may be direct force or perhaps may even be indirect force. A desired closed position may include placing a moveable jaw as tightly around an object, such as a frame of a bicycle, as possible. In embodiments, an object (1) may be securely fastened to the mouth such that the object may not be moved within the mouth.

Figure 7:
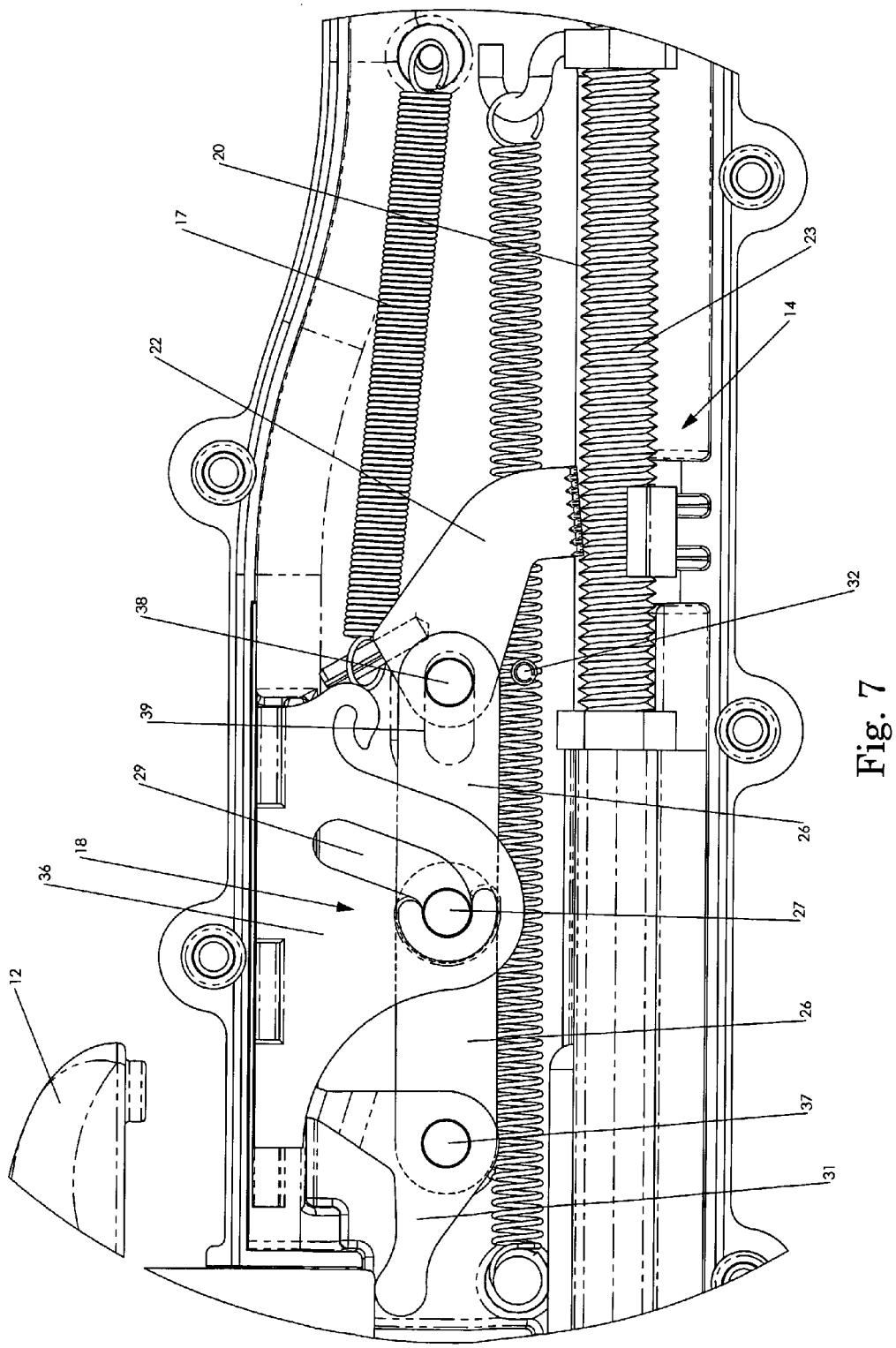
FIG. 7 is an exploded view of a toggle joint when a pawl may be engaged with a ratchet in accordance with embodiments of the present invention.

Once a force may be removed or released from a moveable jaw, it may be important to maintain a position of a mouth (and moveable jaw) at the desired closed position so that the object may remain clamped. In embodiments, the present invention may provide unidirectionally moving a moveable jaw perhaps with a unidirectional jaw movement element and perhaps even with a jaw position holder. A unidirectional jaw movement element may allow a moveable jaw to be moved in one direction and prevented from moving in another such as in an opposite direction. For example, when force may be applied to a moveable jaw, a ratchet mechanism (14) may be employed and moved, as shown in FIG. 7. As force may be applied to a moveable jaw, the moveable jaw and a slide may in effect apply force to a ratchet (23). A ratchet may be a toothed bar such as, but not limited to, a lead screw having threads, a ratchet wheel having teeth, and the like. As a ratchet, such as a lead screw, may be pushed, threads (20) on a lead screw may act like teeth to which a pawl (22) may move along. A pawl may be adapted to engage with teeth of a ratchet, for example with threads of a lead screw or the like so as to prevent movement in the opposite direction.

As FIG. 7 shows, for example, a pawl may have at least one notch to which a thread (20) may fit. Accordingly, as a moveable jaw may be pushed, a lead screw which may be attached to the moveable jaw, may be moved allowing a pawl to move over threads of a lead screw in one direction while preventing the lead screw and moveable jaw to move in the opposite direction. In embodiments, a one-step movement may provide attachment of various size and shape objects to a clamp. Once a clamp may be secured to an object, it may not need to be readjusted.

A moveable jaw, slide and perhaps even a lead screw may be attached to one another, or perhaps even responsive to one another, wherein a movement to one of them may cause movement to the others. Of course, in alternative embodiments, other unidirectional jaw movement elements may be used. For example, but certainly not limited to, a unidirectional jaw movement may include the use of a canted ring or plate as used in telescoping tent poles, caulking guns, woodworking pipe clamps, or the like.

Accordingly, some independent aspects may include:

A bicycle support apparatus comprising a clampable mouth having jaws and a unidirectional jaw movement element.

A method of using a bicycle clamp comprising the steps of placing an object into a clampable mouth having at least two jaws; unidirectionally moving at least one of said jaws towards a closed position; and securely holding said object within said jaws of said mouth.

In embodiments, an object may have some movement capability between a stationary jaw and a moveable jaw even after a moveable jaw may be placed into a desired closed position. The present invention may provide tightening of a moveable jaw around part of a bicycle after the moveable jaw has been placed in a closed position. This tightening may increase a force of the jaws around the bike, such as with a jaw force increase element (25) as seen in FIGS. 1-4, causing the mouth to tightly hold onto the bicycle. For example, a knob and a lead screw, such as the same lead screw as previously discussed, may be used to tighten a moveable jaw around part of a bicycle. A knob may be turned so that a lead screw may also be turned causing the lead screw to engage with a pawl and a moveable jaw may be tightened against a bicycle. Of course, any kind of tightening mechanism may be used as well as various knobs. For example, a knob may have no arms, one arm, two arms, three arms, four arms and the like to assist a user in grasping and turning a knob.

Use of a ratchet mechanism and even a toggle joint may assist in holding jaws of a mouth in a closed position until a desired release time. As a moveable jaw may be pushed into a desired closed position, a lead screw may also be moved as previously discussed. As the moveable jaw and lead screw move, an internal force may be created within a ratchet mechanism and even a toggle joint (18). A large amount of force may be applied to a pawl and threads of a lead screw, in embodiments. While an internal force may include any amount of force, some examples may include, up to about 2000 pounds or even greater and the like. Of course, such forces may be limitless; a mechanism may be adapted to hold 10,000 pounds or greater depending on its intended use. Alternatively, if a lighter object may be held within a mouth, an internal force may include up to about 40 pounds, up to about 100 pounds, up to about 500 pounds and the like. An internal force may be varied due to the design of the device and the type of object being clamped. Accordingly, these examples are not meant to be construed as limiting to the present invention.

The present invention may provide, in embodiments, an open jaw bias (13) of a slide and moveable jaw. A moveable jaw may be biased towards an open position while a mouth and jaws may securely hold a bicycle in a closed position. For example, an open jaw bias may include a spring or the like.

A bicycle or other object may be released from a closed position such as with a quick release. In embodiments, the present invention may provide a release (12), such as a low force release, as can be seen in FIGS. 1-7. A user may trigger a release (12) to open a moveable jaw of a mouth. Triggering may include any act or event that may serve as a stimulus and/or may initiate a reaction or series of reactions for the release of an object from a mouth. A release may include, in embodiments, a device such as a button, knob, latch, handle, lever or the like which may be pulled, pressed, pushed, slid or the like to release a latch therefore releasing a hold of a bicycle in a mouth.

When a release may be triggered, substantially simultaneously movement such as sliding of a moveable jaw to an open position may occur. A mouth may open mostly concurrent with a triggering of a release. The opening of jaws to an open position may occur within seconds or perhaps even in less than a second of triggering of a release. In embodiments, a slide and moveable jaw may be responsive to a release, such as a low force release, and may move into an open position. When a mouth may be at an open position, an object, such as a bicycle or the like may be detached and removed from a stationary jaw and moveable jaw of a mouth.

Substantial simultaneous movement of a moveable jaw may include movement or even disengagement of parts within a toggle joint and perhaps even a ratchet mechanism. These may act in response to each other. Generally, in embodiments, when a release may be triggered, for example by applying force to a button, a toggle joint may move in response to a release movement which may cause a toggle joint to release its built up internal force. This may in turn directly or perhaps indirectly disengage a pawl from a ratchet to which a slide and moveable jaw may move to an open position.

Figure 3:
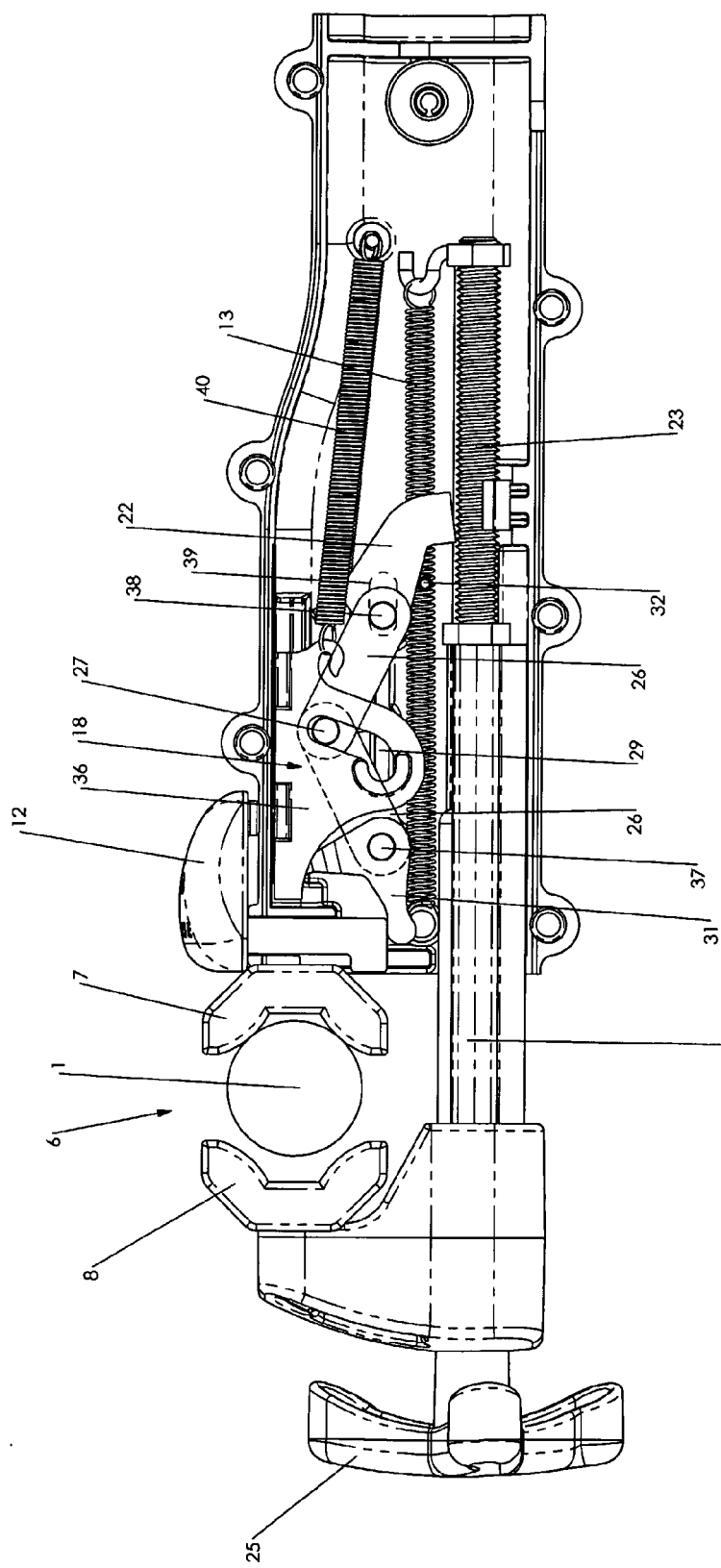
FIG. 3 is a side view of a mouth, ratchet mechanism and toggle joint in the second stage of release where a pawl has been disengaged with the ratchet and the jaw is continuing to open in accordance with embodiments of the present invention.
Figure 4:
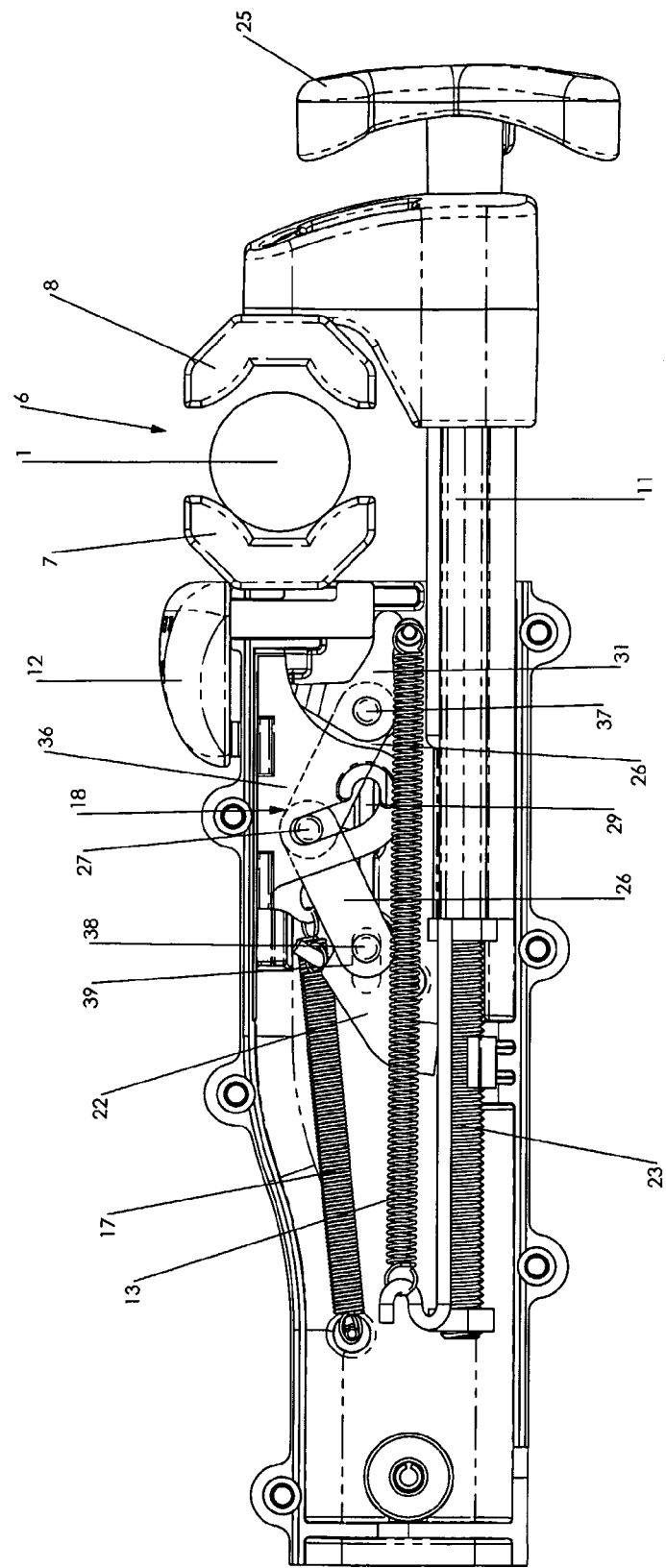
FIG. 4 is an opposite side view of a mouth, ratchet mechanism and toggle joint in the second stage of release where the pawl has been disengaged with the ratchet and the jaw is continuing to open as compared to FIG. 3 in accordance with embodiments of the present invention.
Figure 13:
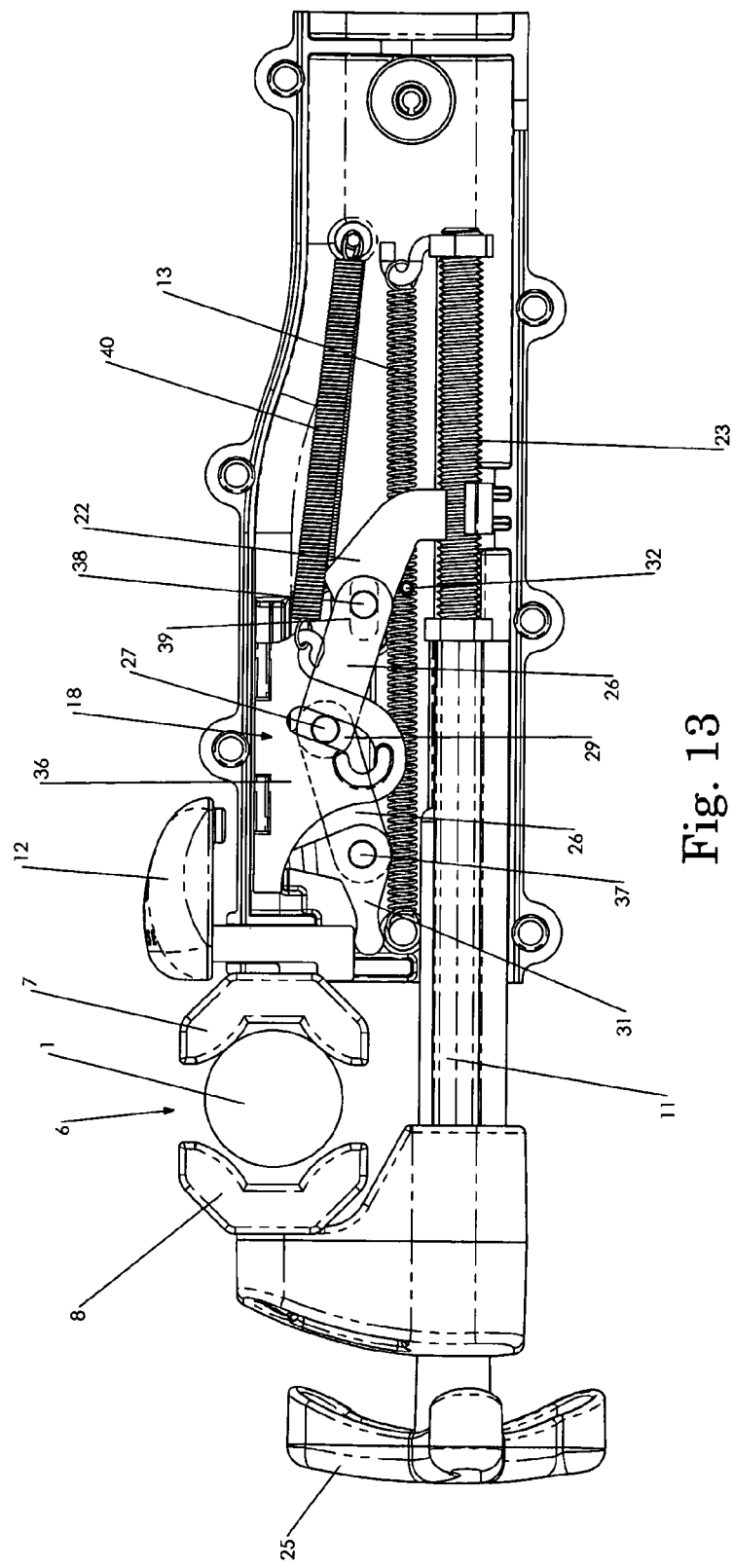
FIG. 13 is a side view of a mouth, ratchet mechanism and toggle joint in a first stage of release where a release has been triggered, the load on a pawl and a ratchet has been relieved, and a jaw is partly opened in accordance with embodiments of the present invention.
Figure 14:
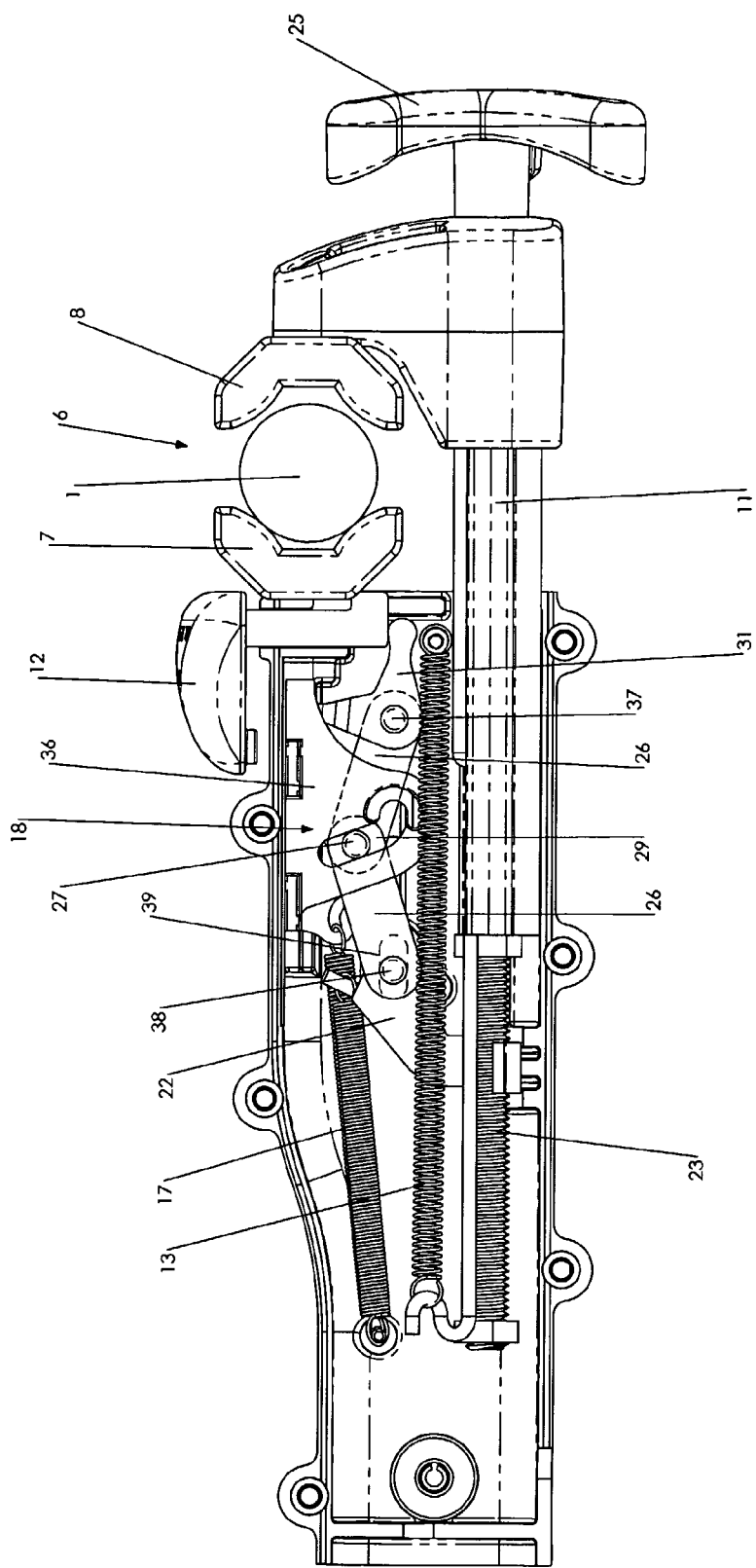
FIG. 14 is an opposite side view of a mouth, ratchet mechanism and toggle joint where in the first stage of release where a release has been triggered, the load on a pawl and a ratchet has been relieved, and a jaw is partly opened as compared to FIG. 13 in accordance with embodiments of the present invention.

As shown in FIGS. 1 and 2, a toggle joint (18) may include two pivot elements (26) attached together by a toggle pin (27). An end of the toggle joint, for example an end of a pivot element, may be pivotally anchored by a pin (37). Another end of the toggle joint, for example an end of a second pivot element, may be linearly guided by a pin (38) that may travel in a guide slot (39) and may anchor a pawl (22) to the toggle joint. A toggle pin (27) may move along a cam path (29) that may be part of a cam slider (36) as can be seen in FIGS. 3 and 4. FIGS. 1 and 2 show a closed position jaw wherein a toggle joint has two pivot elements held in a planar or linear position by a cam path. A ratchet mechanism may provide a removably engaged pawl which may be engaged to threads of a lead screw. When a release may be depressed, such as in FIGS. 13 and 14, a release pivot lever (31) may be moved pivotally which may cause a cam slider (36) to move. This motion may cause a load of a toggle joint to release and the two pivot elements may move, perhaps into an inverted, or even a partially inverted "v" arrangement, as a toggle pin may be moved along a cam path (29). A release of the toggle joint may allow a pawl to move and a moveable jaw to move to a partially open position, such as shown in FIGS. 13 and 14. As a pawl may continue to move and as toggle joint pivot elements may continue to move, a pawl may be pushed away from a lead screw with a pawl disengagement pin (32) shown in FIGS. 3 and 4. When a pawl may be fully disengaged from threads of a lead screw, a slide and moveable mouth may spring open to an open position allowing the jaws to be fully opened as in FIGS. 5 and 6. To ensure that a moveable jaw does not become disengaged from a mouth, the present invention may provide an open jaw stop which may stop a moveable jaw at an open position. A stop nut (19) which may be attached at an end of a lead screw may hit a thrust saddle (21) to stop a moveable jaw in an open position. In other embodiments, a rubber bumper or the like energy absorbing device may be included.

After a jaw may be fully opened, and perhaps when a force applied to trigger a release is removed, a ratchet mechanism may be engaged. A cam slider bias (40) may move a cam slider which may move toggle pivot elements (26) to a planar or perhaps even a linear position. A toggle pivot element (26) may move a pawl into a position where it may be placed in contact with a ratchet such as threads of a lead screw. An engaged pawl bias (17) may help to re-engage a pawl to a ratchet. An engaged pawl bias (17) may be attached to a pawl and a cam slider bias (40) may be attached to a cam slider or other part of the ratchet mechanism. An engaged pawl bias and cam slider bias may include a spring which may help to re-engage a pawl to a ratchet. An engaged pawl bias and/or a cam slider bias may position a toggle joint, perhaps including two pivot elements, into a planar position.

In embodiments, the present invention may provide low force triggering of a release such as a low force release. As an object may be held in a secured position within a mouth, the jaws of a mouth may apply a great amount of force to an object to maintain its hold, as previously mentioned. This force may be applied through a ratchet mechanism (14). A pawl may be strongly engaged with threads of a lead screw such as with a large amount of force, as described herein, perhaps making it difficult to remove a pawl from a lead screw when disengagement may be desired. Accordingly, in embodiments, when a release may occur, a low amount of force may be applied to a button or the like which may surprisingly release a large amount of force built up in a ratchet mechanism and may allow, in embodiments, a pawl to become disengaged from a ratchet. A release force or perhaps even a low force may be applied to a release to open a mouth perhaps with a toggle joint responsive to a release, such as a low force release. A toggle joint may be yet one example of how a low force release may ultimately affect the release of a large load. While there are many forces that may be used to trigger a release, some examples may include:
 less than about 5 pounds;
 less than about 8 pounds;
 less than about 10 pounds;
 less than about 15 pounds;
 less than about 20 pounds and the like.

The present invention may provide, in embodiments, a curved stationary jaw (7) and a curved moveable jaw (8) in which an object such as a bicycle may be securely held. Each of the jaws may include a curved contact surface. To enhance gripping, the present invention, in embodiments, may provide a multisized object securement grip (9) on each of the jaws. A multisized object securement grip may be provided by a grip that may contact an object, such as a tube, at points separated by approximately 90 degrees around a tube, as can be seen in FIGS. 8 and 9. An example of a multisized object securement grip (9) may include at least one convex grip attached to the jaws. A convex grip may be an extruding bump from a contact surface of a jaw. Two convex grips may be located on each jaw, in embodiments. A convexly curved grip surface may allow for secure gripping of a large range of sizes of objects and it may even provide gripping security for the smaller, commonly clamped objects, such as bicycle seat posts or the like, without greatly compromising the gripping security for larger objects (35) as shown in FIG. 9. As can be seen in FIGS. 8 and 9, a small object (34) may engage with a contact surface of each of the jaws including at least two contact points to each jaw. A large object (35) may also engage a contact surface of each of the jaws including at least two contact points to each jaw. In comparison, contact between jaws and an object may be similar so that the grip of each object may be similar.

Alternatively, if a grip surface were a planar surface and possibly designed to universally grip small and large sizes of objects with optimal 90 degree contact points, a design may result in a larger grip surface and jaw. This design, when used with smaller tubes, may cause stationary and movable jaws to interfere at their tips and may not adequately allow closing of a mouth. In embodiments, it may be desirable to provide a multisized object securement grip when designing a mouth and jaws that can universally hold different sized objects.

Accordingly, some independent aspects may include:

A bicycle support apparatus comprising a clampable mouth having jaws with multisized object securement grips.

A method of using a bicycle clamp comprising the steps of securely holding an object between jaws of a mouth and gripping multiple sized objects within said jaws.

A stationary jaw and perhaps a moveable jaw may have a surface such as a contact surface made of a material including but not limited to rubber, an elastomer, thermoplastic urethane and the like so that it may grasp an object and may even prevent from scratching or damaging an object. In alternative embodiments, a stationary jaw and a moveable jaw may have a ribbed surface such as on a contact surface for additional gripping. A ribbed surface may be a non-smooth surface having a texture. A texture may include raised bumps, horizontal or vertical raised lines and the like. Alternatively, a contact surface of each jaw may be smooth in other embodiments.

Figure 12:
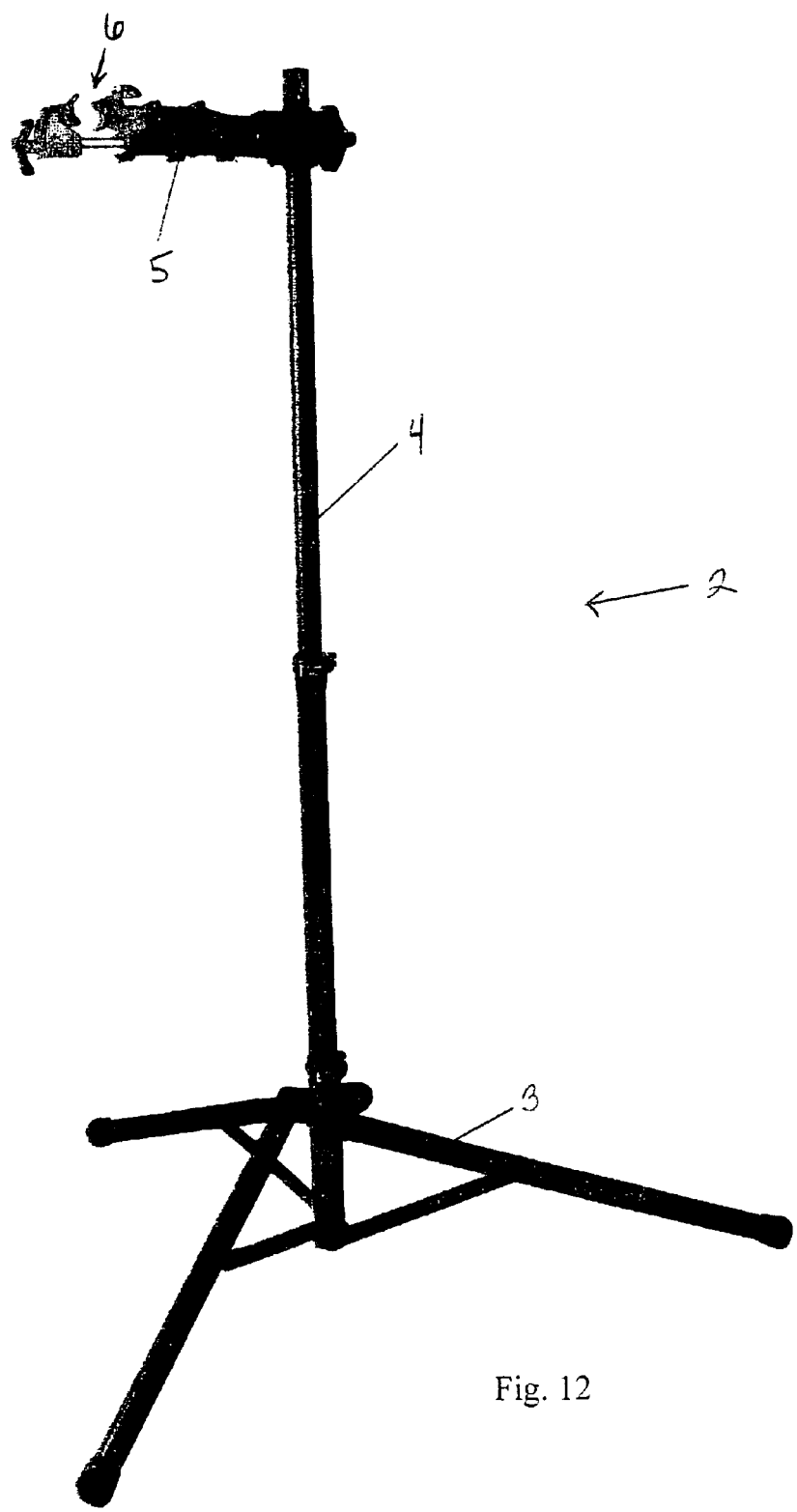
FIG. 12 is a plan view of a mouth and an extended arm attached to a stand having a stem and a tripod in accordance with alternative embodiments of the present invention.

A mouth as described in the various embodiments herein may be used in a number of ways. It may be attached to, but is not limited to: a stand; a bench; a wall, any type of surface; a car or other types of vehicles; and the like. A stand (2) may be used and may include a base (3) and a stem (4). A clampable mouth (6) may be attached to an arm (5) of a stand as shown in FIG. 12. In embodiments, a stand may include a tripod and may even provide for adjusting a height of a stand with an adjustable height stem. Adjustable height stems may include a telescopic stem in which part of a stem may be received into a second part of a stem for telescopically adjusting a height of a stand.

Figure 10:
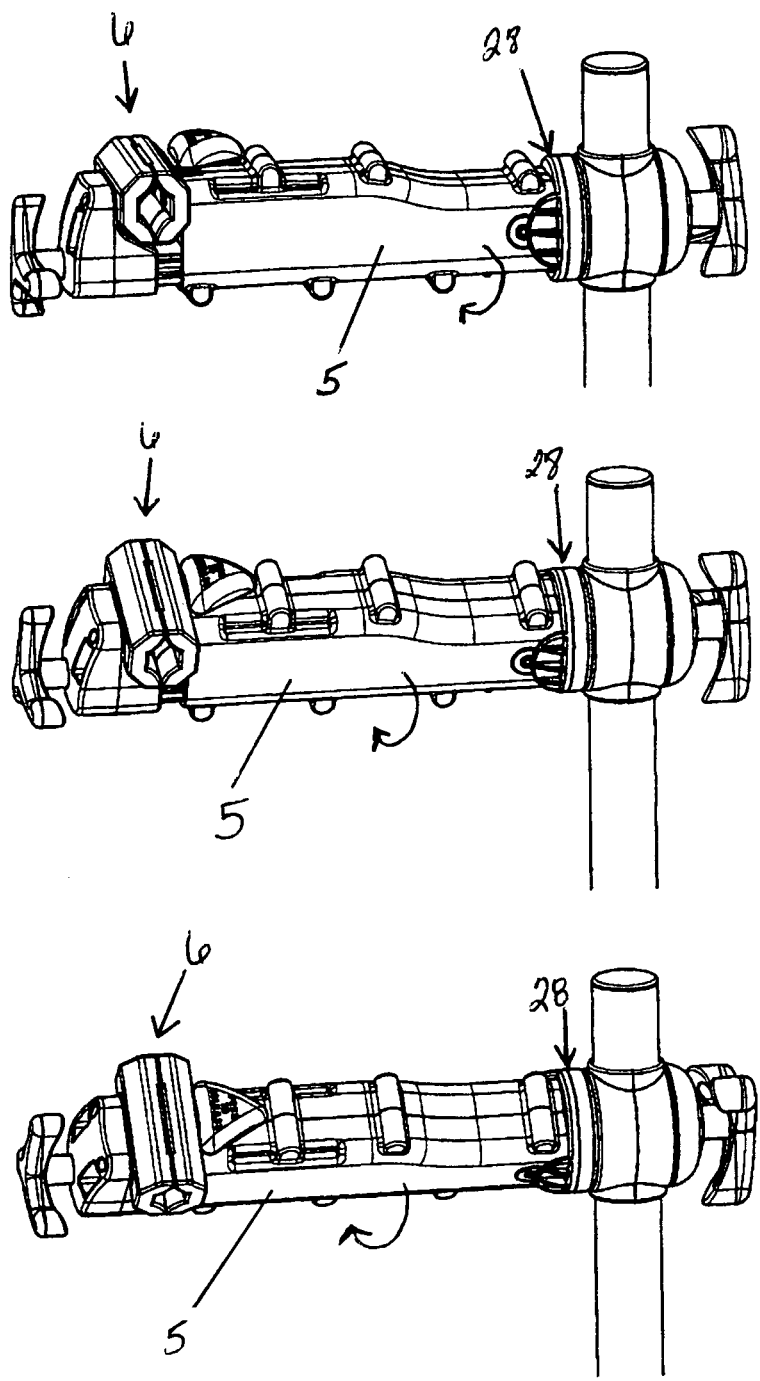
FIG. 10 represents a moveable mouth rotating about a rotational clutch in accordance with alternative embodiments of the present invention.
Figure 11:
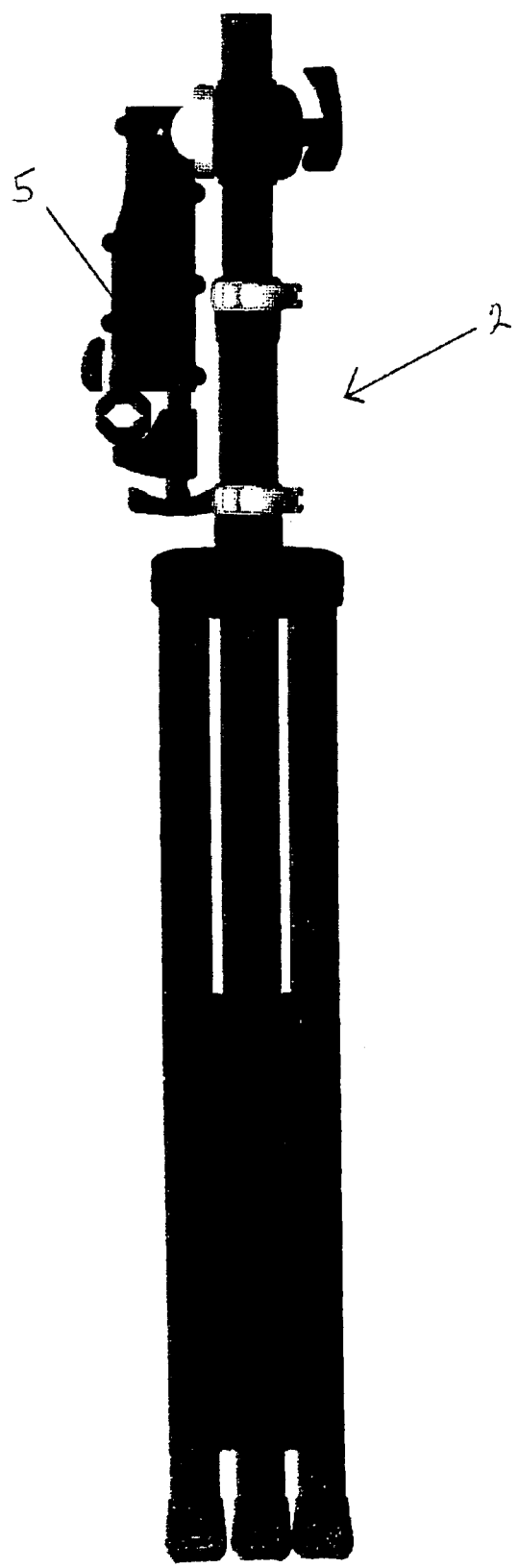
FIG. 11 is a plan view of a closed stand with a folded arm against a stand having a stem and a base in accordance with alternative embodiments of the present invention.

In other embodiments, such as if a mouth is used for bicycle repair, it may be desirable to provide a rotatable mouth, such as by rotating an arm (5) to which a mouth (6) may be attached, as can be seen in FIG. 10. An arm (5) may be rotated along an axis and may even be rotated with a rotational clutch (28) so that an arm may be rotated and may be held into a desired rotated position. In yet other embodiments and as shown in FIG. 11, the present invention may provide storage capability of a support apparatus or the like and may even provide for a foldable arm so that a mouth (6) attached to an arm (5) may be folded along a stem of a stand (2).

As can be easily understood from the foregoing, the basic concepts of the present invention may be embodied in a variety of ways. It involves both clamping techniques as well as devices to accomplish the appropriate clamp. In this application, the clamping techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that included in this or any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date. With this understanding, the reader should be aware that this disclosure is to be understood to support the present claims as well as any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "release" should be understood to encompass disclosure of the act of "releasing"—whether explicitly discussed or not—and, conversely, were there effectively disclosure of the act of "releasing", such a disclosure should be understood to encompass disclosure of a "release" and even a "means for releasing" Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list below or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

I. US Patent Documents

| DOCUMENT NO. & KIND CODE (if known) | PUBLICATION DATE (mm/dd/yyyy) | PATENTEE OR APPLICANT NAME |
|---|---|---|
| Des. 326,969 | 06-16-1992 | Eason et al. |
| Des. 416,464 | 11-16-1999 | Eason |
| Des. 421,447 | 03-07-2000 | Eason et al. |
| Des. 435,365 | 12-26-2000 | Eason et al. |
| D 356,901 | 04/04/1995 | Schoenig et al. |
| D 372,691 | 08/13/1996 | Eason |
| D 450,339 S | 11-13-2001 | Eason |
| 3,947,010 | 03/30/1976 | Zeller |
| 3,981,491 | 09/21/1976 | Snyder |
| 4,671,479 | 06-09-1987 | Johnson et al. |
| 4,887,754 | 12/19/1989 | Boyer et al. |
| 5,048,789 | 09-17-1991 | Eason et al. |
| 5,222,707 | 07/29/1993 | Meyers |
| 5,277,346 | 01/11/1994 | Stier |
| 5,385,280 | 01/31/1995 | Littlepage et al. |
| 5,605,321 | 02/25/1997 | Jarvis |
| 5,638,706 | 06/17/1997 | Stevens |
| 5,769,556 | 06/13/1998 | Colley |
| 5,791,610 | 08/11/1998 | Sanchez |
| 5,996,814 | 12/07/1999 | Workman et al. |
| 6,273,392 B1 | 08/14/2001 | Birkhold |
| 6,283,421 B1 | 09-04-2001 | Eason et al. |
| 6,375,135 B1 | 04-23-2002 | Eason et al. |
| 6,547,116 B2 | 04/15/2003 | Anderson et al. |
| 6,789,772 B2 | 09-14-2004 | Eason |

II. Other Documents

Pedro's USA, Repair Stand, pedrosusa.com/repairstand, 1 page, Jan. 12, 2005

Ultimate Support Systems, Inc. 1994 Product Catalog
Ultimate Support Systems, Inc. 1996 Product Catalog
Ultimate Support Systems, Inc. 1999 Product Catalog
Ultimate Support Systems, Inc. 2000 Product Catalog
Ultimate Support Systems, Inc. 2001 Product Catalog
Ultimate Support Systems, Inc. 2002 Product Catalog
Ultimate Support Systems, Inc. 2003 Product Catalog Thus, the applicant(s) should be understood to have support to claim and make a statement of invention to at least: i) each of the bicycle clamp devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the applicant may at any time present only initial claims or perhaps only initial claims with only initial dependencies. Support should be understood to exist to the degree required under new matter laws—including but not limited to European Patent Convention Article 123(2) and United States Patent Law 35 U.S.C. §132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments. Accordingly, it is understood that the word "bicycle" may be replaced by the word "object" or any other specific object and presented in claims in an amendment to this application or in claims of a subsequent patent application, if desired.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A quick trigger release bicycle support apparatus comprising:
    a clampable mouth having a stationary jaw and a moveable jaw;
    a slide moveably attached to said moveable jaw and configured to linearly move said moveable jaw with respect to said stationary jaw;
    a threaded ratchet mechanism having a pawl with a plurality of notches and a threaded ratchet, wherein said pawl with said plurality of notches is configured to releasably engage a substantial portion of said threaded ratchet, and wherein said pawl with said plurality of notches and said threaded ratchet are configured to hold said moveable jaw in a closed mouth position when engaged until released;
    an open jaw spring bias on said slide which is connected to said moveable jaw when said moveable jaw is in said closed mouth position;
    a tightening mechanism connected to said threaded ratchet mechanism to tighten said moveable jaw after placed in said closed mouth position; and
    a separate depressable low force push button release configured to substantially simultaneously disengage said pawl with said plurality of notches from said threaded ratchet of said threaded ratchet mechanism and configured to substantially simultaneously trigger said open jaw spring bias on said slide and said moveable jaw when said depressable low force push button release is depressed allowing said slide and said moveable jaw to automatically spring open from said closed mouth position to an open mouth position.

2. The quick trigger opening bicycle support apparatus according to claim 1 and further comprising a multisized object securement grip attached to a contact surface of said stationary jaw and said moveable jaw.

3. The quick trigger release bicycle support apparatus according to claim 1 wherein said depressable low force push button release comprises a release force selected from a group consisting of:
    less than about 5 pounds;
    less than about 8 pounds;
    less than about 10 pounds;
    less than about 15 pounds; and
    less than about 20 pounds.

4. The quick trigger release bicycle support apparatus according to claim 1 wherein said depressable low force push button release comprises a single step depressable low force push button release.

5. The quick trigger release bicycle support apparatus according to claim 1 and further comprising a toggle joint responsive to said depressable low force push button release.

6. The quick trigger release bicycle support apparatus according to claim 5 wherein said toggle joint comprises two pivot elements attached together with a toggle pin.

7. The quick trigger release bicycle support apparatus according to claim 1 and further comprising a unidirectional jaw movement element.

8. The quick trigger release bicycle support apparatus according to claim 1 wherein said threaded ratchet comprises a lead screw.

9. The quick trigger release bicycle support apparatus according to claim 8 and further comprising an engaged pawl bias.

10. The quick trigger release bicycle support apparatus according to claim 9 wherein said engaged pawl bias comprises a spring.

11. The quick trigger release bicycle support apparatus according to claim 1 and further comprising an open jaw stop.

12. The quick trigger release bicycle support apparatus according to claim 1 wherein said stationary jaw and said moveable jaw comprises a curved stationary jaw and a curved moveable jaw.

13. The quick trigger release bicycle support apparatus according to claim 12 wherein said curved stationary jaw and said curved moveable jaw comprises a curved contact surface.

14. The quick trigger release bicycle support apparatus according to claim 13 wherein said curved contact surface of each of said jaws comprises a multisized object securement grip.

15. The quick trigger release bicycle support apparatus according to claim 14 wherein said multisized object securement grip comprises at least one convex grip.

16. The quick trigger release bicycle support apparatus according to claim 15 wherein said at least one convex grip comprises two convex grips on each of said jaws.

17. The quick trigger release bicycle support apparatus according to claim 13 wherein said curved contact surface comprises a ribbed surface.

18. The quick trigger release bicycle support apparatus according to claim 13 wherein said curved contact surface comprises a material selected from a group consisting of rubber, an elastomer, and thermoplastic urethane.

19. The quick trigger release bicycle support apparatus according to claim 8 wherein said lead screw is attached to said slide.

20. The quick trigger release bicycle support apparatus according to claim 1 wherein said tightening mechanism comprises a jaw force increase element.

21. The quick trigger release bicycle support apparatus according to claim 20 wherein said jaw force increase element comprises a knob and a lead screw.

22. The quick trigger release bicycle support apparatus according to claim 21 wherein said knob comprises a three-arm knob.

23. The quick trigger release bicycle support apparatus according to claim 21 wherein said moveable jaw and said slide is responsive to said knob and said lead screw.

24. The quick trigger release bicycle support apparatus according to claim 1 wherein said threaded ratchet mechanism comprises an internal force applied to said mouth when said moveable jaw is at a desired closed position.

25. The quick trigger release bicycle support apparatus according to claim 24 wherein said internal force comprises up to about 2000 pounds.

26. The quick trigger release bicycle support apparatus according to claim 1 wherein said open jaw spring bias comprises a spring.

27. The quick trigger release bicycle support apparatus according to claim 1 and further comprising a stand having a base and stem, wherein said clampable mouth is attached to said stand.

28. The quick trigger release bicycle support apparatus according to claim 27 wherein said clampable mouth attached to said stand comprises a clampable mouth attached to an arm of said stand.

29. The quick trigger release bicycle support apparatus according to claim 27 wherein said base comprises a tripod and wherein said stem comprises an adjustable height stem.

30. The quick trigger release bicycle support apparatus according to claim 29 wherein said adjustable height stem comprises a telescopic stem.

31. The quick trigger release bicycle support apparatus according to claim 1 wherein said clampable mouth comprises a rotatable clampable mouth.

32. The quick trigger release bicycle support apparatus according to claim 31 wherein said rotatable clampable mouth comprises a rotational clutch.

33. The quick trigger release bicycle support apparatus according to claim 28 wherein said arm comprises a foldable arm.

* * * * *